March 25, 1958 R. A. WEIR 2,827,844
INSECT EXCLUDER
Filed Oct. 21, 1953 2 Sheets-Sheet 1
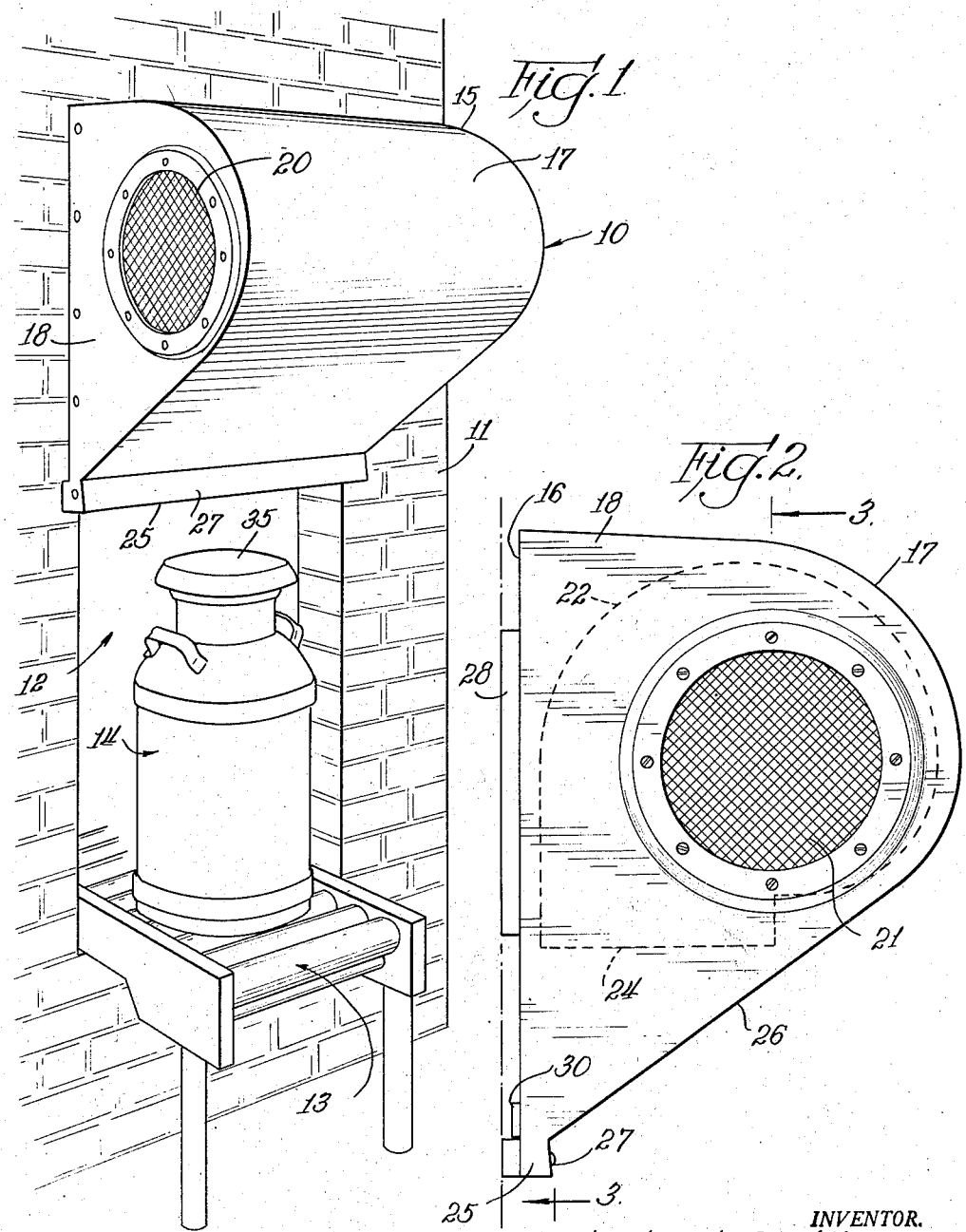
INVENTOR.
Robert A. Weir
BY
E. Manning Giles
Atty.

March 25, 1958  R. A. WEIR  2,827,844
INSECT EXCLUDER
Filed Oct. 21, 1953  2 Sheets-Sheet 2

INVENTOR.
Robert A. Weir
BY
E. Manning Gill
Atty.

2,827,844

INSECT EXCLUDER

Robert A. Weir, Cedar Rapids, Iowa, assignor to Cherry-Burrell Corporation, Chicago, Ill., a corporation of Delaware Application October 21, 1953, Serial No. 387,443

3 Claims. (Cl. 98—36)

My invention relates to an insect excluder and has reference more particularly to a device for creating a relatively broad and comparatively thin flow of air in front of unscreened doors and openings into buildings in order to blow flying insects away from such openings and to prevent their entry therein.

In dairy plants, for example, there is a relatively continuous movement of milk cans from delivery trucks through doors or window-like openings in the dairy plant wall to the receiving point therein where the milk is to be removed from the cans. The continual movement of such cans through such receiving doors in the building walls makes it impractical to provide conventional screens or other means for keeping flies and insects out of the building. Owing to the requirements for extreme sanitation and freedom from any form of contamination in dairy plants, however, it is most important to keep such plants substantially free of insects, and it is for that purpose that my insect excluder was conceived.

It is the principal object of my invention to provide a device for producing a continuous flow of air which is of sufficient width to blanket an opening of the type to be found in dairy plants where the milk cans are received and which is of sufficient velocity to serve as an effective barrier to the passage of flying insects through such openings.

It is a further object of my invention to provide such a device which may be readily installed over existing openings with a minimum of installation work.

It is a still further object of my invention to provide an insect excluding blower which is simple in design and economical to manufacture, these and other objects being accomplished as hereinafter described, reference being had to the accompanying drawings in which Fig. 1 is a perspective view showing a milk can receiving opening in a milk plant wall with an insect excluder embodying my invention mounted thereabove;

Fig. 2 is a side view of the insect excluder shown in Fig. 1;

Figure 3:
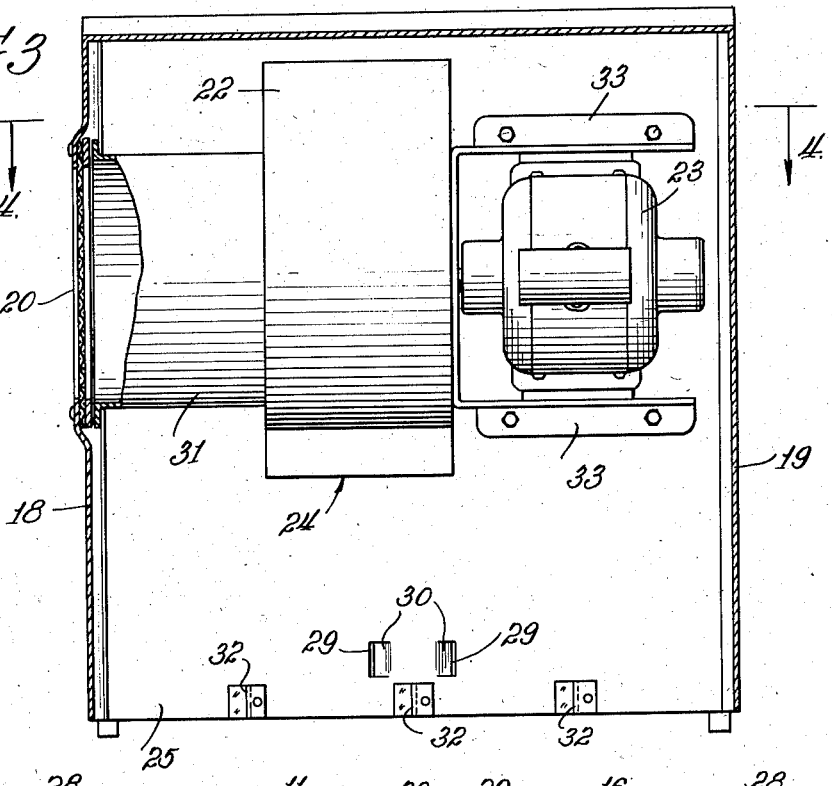
Fig. 3 is a sectional view of the line 3—3 of Fig. 2.

Referring now to the drawings, the insect excluder is designated generally by the reference numeral 10 and, as shown in Fig. 1, may be mounted on the wall 11 of a building provided with a receiving door 12 in said wall 11. At the bottom of the receiving door 12 there is provided a roller conveyor 13 of the type commonly used for sliding milk cans into a dairy building and a milk can 14 is shown on said conveyor 13.

The insect excluder 10 consists of an external housing 15 of slightly greater width than the receiving door 12 over which it is designed to be mounted, said external housing 15 having a relatively flat, vertically disposed, mounting wall 16 at the side adapted to face the building wall 11.

In a preferred form the opposed wall 17 of the external housing 15 extends outwardly from engagement with the top edge of the flat mounting wall 16 to form a top and then curves downwardly and back at an angle toward the bottom edge of the flat vertical wall 16 as shown in Figs. 1 and 2.

The external housing 15 is provided at its respective sides with side walls 18 and 19, the side wall 18 being provided with an air intake 20 which is suitably covered with a screen 21 or other perforated material to keep out any bugs or insects.

A centrifugal blower is mounted within the external housing 15 and is enclosed within a volute casing 22 as shown in dotted lines in Fig. 2. The centrifugal blower is of the conventional impeller type and is adapted to be driven by a suitable electric motor 23 mounted on the opposite side of the volute casing 22 from the air intake 20. Thus, when the impeller is in operation, air is drawn inwardly through the air intake 20 and is impelled downwardly through the outlet 24 at the bottom of the volute casing 22.

The air excluder 10 is provided at the bottom with an elongated slot extending from side wall 18 to side wall 19 and defined at its respective sides by the lower edges of the mounting wall 16 and the opposed wall 17, and said slot serves as the air discharge outlet 25. By reason of its length and its comparatively narrow width, the air discharge outlet 25 expels air in a relatively broad path. The air discharged from the volute casing 22 is discharged against the inwardly sloping wall 26 of the external housing 15 and is deflected thereby toward the air discharge outlet 25 and also laterally toward the respective side walls 18 and 19 so that the air flow through the air discharge outlet 25 is of substantially uniform pressure and velocity the entire length of said discharge outlet 25.

As shown in Fig. 2, the inwardly sloping wall 26 may be provided with a downwardly extending flange or skirt 27 in order to direct the air flow downwardly from the air discharge outlet 25 in a predetermined path. In a preferred form, the flange or skirt 27 would angle back slightly away from the mounting wall 16 as shown in Fig. 3 so as to impart a slight outward tendency to the air flow therefrom.

Figure 4:
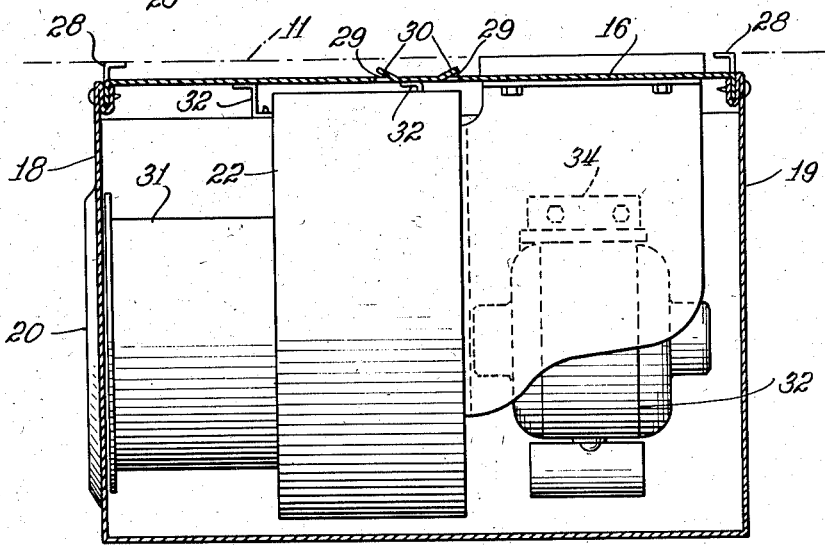
Fig. 4 is a sectional view of the line 4—4 of Fig. 3.

The insect excluder 10 is provided with L-shaped mounting brackets 28 along the respective edges of the mounting wall 16 and these are provided with holes (not shown) through which suitable studs or bolts may be inserted for securing the device to the building wall 11. I have found that it is preferable to have the insect excluder 10 spaced outwardly a short distance, such as an inch or two, from the building wall 11 so as to provide an air space therebetween as shown in Figs. 2 and 4 rather than to mount the device flush against such wall. Moreover, I have found it advantageous to provide air vents 29 in the mounting wall 16 adjacent the discharge opening 25 and these air vents 29 may be formed by punching out portions 30 of the mounting wall 16 so that a limited amount of the air under pressure within the external housing 15 may escape through said air vents 29, the escaping air being deflected by the punched out portions 30 toward the respective sides of the mounting wall 16, thus insuring a constant outward flow of air from the space between the mounting wall 16 and the building wall 11 when the insect excluder 10 is in operation.

Normally, the mounting wall 16, the opposed wall 17, and the respective side walls 18 and 19 would be formed of suitable sheet metal, such as steel, and the adjoining edges thereof would be welded together to form a securely assembled external housing 15. Likewise the volute casing 22 would be formed of similar sheet metal and would be provided with a tubular duct 31 communicating between said volute casing 22 and the air intake 20. The volute casing 22 may be supported as shown in Fig. 4 by means of brackets 32 secured to the interior of the mounting wall 16 and the motor 23 may be supported by brackets 33 secured to the mounting wall 16 and a bracket 34 secured to the opposed wall 17 as shown in Figs. 3 and 4.

In operation, the electric motor 23 would be started by an external switch (not shown) whenever the door or opening 12 in the building wall 11 was to be opened to permit milk cans to slide inwardly therethrough on the conveyor 13. The impeller operated by said electric motor 23 functioning in a conventional manner would draw air inwardly through the air intake 20, the air being freed of bugs, insects, and other undesirable material by passage through the screen 21. The air discharged from said volute casing 22 through the outlet 24 would build up a pressure within the housing 15 and would be deflected by the inwardly sloping wall 26 so as to insure substantially uniform distribution of the moving air across the entire length of the air discharge outlet 25 and the air discharged therefrom would move through a substantially predetermined downward path the width and depth of the door or opening 12, with an effective velocity throughout the entire distance. Insects seeking to fly into the building through the opening 12 would encounter the rapidly moving wall of air expelled through the air discharge outlet 25 and would be thrown off course.

I have found that by discharging air from said air discharge outlet at a relatively high velocity the moving air tends to eddy about under the cover 35 of a milk can 14 passing through the door or opening 12 in such a way as to dislodge flies and other insects which may be on the can 14 in such concealed position. Likewise the rapidly moving air tends to blow flies and other loose material off of the outside of the can 14 as it passes under the insect excluder 10. Thus the insect excluder 10 embodying my invention acts as an effective barrier to the entry of flies and insects through the door or opening 12 into the interior of the building.

While I have shown the air excluder 10 as adapted for use in connection with receiving room doors or openings for dairy plants, I am aware that it can be used in modified forms in connection with other openings and doorways in walls and partitions where it is impractical to use screens because of the constant passage of articles or persons therethrough but where it is important to prevent flying insects from passing through said openings, and accordingly my invention is not limited to the disclosures herein but rather the scope is to be determined by the appended claims.

I claim:

1. In a device of the class described, the combination of a plenum chamber casing and a blower mounted therein, said casing comprising the combination of a flat wall having a relatively straight edge along one side, an opposed wall disposed obliquely toward said edge and having a corresponding edge spaced therefrom to form an elongated slot, and two end walls and a top wall joined marginally to the flat wall and to the opposed wall, said blower having an air inlet communicating with the exterior of the casing through an opening in one of said walls and having an outlet disposed to discharge air within said casing.

2. In a device of the class described, the combination of a plenum chamber casing and a blower mounted therein, said casing comprising the combination of a flat wall having a relatively straight edge along one side, an opposed wall disposed obliquely toward said edge and having a corresponding edge spaced therefrom to form an elongated slot, and two end walls and a top wall joined marginally to the flat wall and to the opposed wall, said blower having an air inlet communicating with the exterior of the casing through an opening in one of said walls and having an outlet disposed to discharge air within said casing, said slot being provided with a downwardly depending peripheral skirt.

3. In a device of the class described, the combination of a plenum chamber casing and a blower mounted therein, said casing comprising the combination of a relatively flat rectilinear wall, an elongated opposed rectilinear wall having a transverse hump, and corresponding end walls, an edge of said humped wall being spaced from a corresponding edge of said flat wall to form an elongated air discharge slot, said blower having an air inlet portion communicating with the exterior of the casing through an opening in one of said walls and having an air outlet disposed toward said air discharge slot.

References Cited in the file of this patent

UNITED STATES PATENTS

| | | |
|---|---|---|
| 870,740 | McIver et al. | Nov. 12, 1907 |
| 1,095,499 | Gillespie | May 5, 1914 |
| 1,643,717 | Linon et al. | Sept. 27, 1927 |
| 1,944,810 | Rogers | Jan. 23, 1934 |
| 2,073,744 | Henney | Mar. 16, 1937 |
| 2,150,252 | Shure | Mar. 14, 1939 |
| 2,558,997 | Voelker | July 3, 1951 |
| 2,679,202 | Koff | May 25, 1954 |